(12) United States Patent
Tabor et al.

(10) Patent No.: US 11,131,478 B1
(45) Date of Patent: Sep. 28, 2021

(54) AIR CEILING INLET UNIT

(71) Applicant: Double L Group, LLC, Dyserville, IA (US)

(72) Inventors: Elizabeth Tabor, Baldwin, IA (US); Dick Streicher, Farmersburg, IA (US)

(73) Assignee: DOUBLE L GROUP, LLC, Dyersville, IA (US)

( * ) Notice: Subject to any disclaimer, the term of this patent is extended or adjusted under 35 U.S.C. 154(b) by 0 days.

(21) Appl. No.: 16/748,320

(22) Filed: Jan. 21, 2020

Related U.S. Application Data

(60) Provisional application No. 62/794,876, filed on Jan. 21, 2019.

(51) Int. Cl.
*F24F 13/14* (2006.01)
*A01K 1/00* (2006.01)

(52) U.S. Cl.
CPC ........ *F24F 13/1413* (2013.01); *A01K 1/0052* (2013.01); *A01K 1/0058* (2013.01); *F24F 13/1406* (2013.01)

(58) Field of Classification Search
CPC .......................... A01K 1/0058; F24F 13/1486; F24F 13/1413; F24F 13/1406
USPC ............ 119/448; 16/225–227; 454/336, 347, 454/353
See application file for complete search history.

(56) References Cited

U.S. PATENT DOCUMENTS

| | | | |
|---|---|---|---|
| 2,507,965 A * | 5/1950 | Eichner | E05D 1/02 16/225 |
| 2,660,105 A | 11/1953 | Sabin et al. | |
| 4,671,350 A * | 6/1987 | Toukola | A01K 1/0058 165/135 |
| 5,105,849 A * | 4/1992 | Clough | B60H 1/249 137/512.15 |
| 5,201,685 A * | 4/1993 | Raisanen | A01K 1/0058 454/259 |
| 6,685,557 B1 * | 2/2004 | Hoffe | F24F 13/06 137/527.8 |
| 2007/0137108 A1 * | 6/2007 | Ohanesian | E06B 7/08 49/74.1 |

* cited by examiner

*Primary Examiner* — Vivek K Shirsat
(74) *Attorney, Agent, or Firm* — Shuttleworth & Ingersoll, PLC; James C. Nemmers

(57) ABSTRACT

A ceiling inlet unit that assists in bringing air into the interior room of a building. The unit has a housing providing an opening to the attic of the building, the housing having movable blades with brush borders on the ends, pivotally mounted with a continuous hinge in the housing with seals to minimize air leakage when the blades are closed. The housing is designed in such a way to provide optimal air mixing situations through available cross-sectional area at different ventilation stages. The blades are designed to maximize air jet throw during lower ventilation stages, and provide superior total airflow during maximum ventilation stages.

18 Claims, 17 Drawing Sheets

AIR CEILING INLET UNIT

This application claims priority to U.S. Provisional Patent Application No. 62/794,876 filed Jan. 21, 2019, which application is incorporated by reference herein.

BACKGROUND OF THE INVENTION

Ventilating the interior of buildings is highly desirable and essential wherever living creatures or plants are being maintained. For example, the interior conditions must be controlled in buildings used for warehousing or industrial storage, for the raising of vegetables and plants, or for raising swine or livestock. For those buildings where living creatures are being raised, proper interior ventilation is essential to their good health and in order to have good production efficiencies. If proper ventilation is not achieved during the winter, buildings will most likely be cool, damp, and non-uniform in air distribution or temperature if the building is located in the northern climates. In the summer, the interior of the building will likely be hot and humid. Ventilation is a process to control the temperature, humidity, other gases, and uniformity within the building, and with controlled ventilation, an improved environment can be maintained.

An ongoing problem in such buildings is to maintain a proper interior temperature and air uniformity especially where the building houses livestock or swine. Excessive heat or cold in the building can adversely affect the health and production efficiencies of the live animals being housed. Typically, ceiling inlets of various designs are used in cooperation with ventilating fans, outlet dampers, or shutter walls to provide an air intake from the ceiling into the interior room of the building. Leakage of outside air into the interior room from the attic increases heating costs during cold exterior temperatures, since more fuel is required to maintain a desired condition. During times of extreme high temperatures outside the building, leakage of attic air to the interior room of the building can potentially add to heat stress for the swine or livestock and add cost due to an increased ventilation rate to mitigate the rise in temperature.

The degree of air mixing within the room is also essential to maintain improved conditions inside the building. There are known and used numerous designs of air inlets that can be mounted on the ceiling of a building. These units typically contain an inlet having between 1-4 moveable blades from an open to closed position. There are typically two kinds of operation for these inlets; counterweighted and actuated. Counterweighted inlets operate automatically in response to the negative or positive pressure created in the building by exhaust fans. Actuated inlets respond to the response of an actuator that is typically controlled by a controller or manually. The actuator dictates when and how much the blades will open and shut to allow airflow into the interior room. The actuator will respond to the controllers' instructions which are affected by interior room conditions such as temperature and relative humidity, and the actuator will open the inlets accordingly to control the total volume of air entering the interior room. The relationship between air jet throw (velocity) and total volumetric flow rate that enters through the inlets can be described to those skilled in the art by these equations:

$$\dot{V} = A_{actual} \vec{v} \tag{1}$$

Where:
$\dot{V}$=Total volume of air entering through inlet
$A_{actual}$=Total Cross-sectional area of opening for air to move through
$\vec{v}$=velocity of incoming air $$\dot{V} = C_d A_{actual} \sqrt{\frac{2\Delta P}{\rho}} \tag{2}$$

Where:
$\dot{V}$=Total volume of air entering through inlet
$A_{actual}$=Total Cross-sectional area of opening for air to move through
$C_d$=drag coefficient of the inlet
P=Static pressure differential across inlet
$\rho$=density of incoming air However, with known ceiling inlets of the actuated type with two blades, the air jet throw during minimum ventilation is not the most efficient, thus reducing the uniformity of mixing of air quality and temperature in all areas of the interior room. Also, for inlets that have tolerable air jet throw, the maximum volumetric flow rate of air (in cfm) is not high enough to satisfy ventilation rates needed by exhaust fans without addition of quantities of said inlets into room. Moreover, the ceiling inlets do not seal up tightly, thus allowing attic air to leak into the interior room. There is therefore a need for an improved ceiling inlet that will provide superior air jet throw during minimum ventilation periods, while also providing a larger total volumetric flow rate of air during maximum ventilation periods, and will mitigate leakage when the ceiling inlet is in the closed position.

SUMMARY OF THE INVENTION

The ceiling inlet of the invention will more effectively mix air at different openings by operating with a more efficient air jet throw, will overcome leakage issues, and will provide increased maximum airflow while still providing increased control of air movement at smaller openings. The ceiling inlet of the invention has a housing that is suitable for mounting on the interior ceiling of a building. The housing is provided with an opening to the attic of the building. Two deeper moveable curved blades are mounted with a continuous hinge, and this hinge design provides minimal attic air leakage during a shutoff position. The ceiling inlet is also fully insulated, and designed in such a way that water will always roll away from potential problem areas. The ceiling inlet design also shortens the length of the blade while increasing the overall depth of the blade so the width and the length of the inlet are substantially square instead of rectangular. This curved louver design is deeper than traditional inlets and optimizes both the air jet throw and air mixing uniformity of the inlet during lower stages of ventilation. The deeper blades also provide a substantially larger total airflow capacity compared to traditional inlets of the similar width. The inlet endcap design also minimizes the cross-sectional area available during minimum ventilation periods by reducing any side area available, which increases the overall air jet throw and inlet efficiency. This design provides more control of cubic feet per minute of air movement at a range of static pressures and inlet blade openings, thus producing increased ventilation performance. This design also provides less cubic feet per minute of air movement for leakage, thus producing lower energy usage.

BRIEF DESCRIPTION OF THE DRAWINGS

FIG. 3-3 is a side view of the ceiling inlet of FIG. 1, viewing the inlet as it would appear from the side when inside the room of a building, the view showing both blade assemblies in the closed position;

FIG. 6-6 is a side view of the ceiling inlet similar to FIG. 3-3, viewing the inlet as it would appear from the side when inside the room of a building, but showing one blade in the minimum ventilation position;

FIG. 8-8 is a side view of the ceiling inlet similar to FIGS. 3-3 and 6-6 and viewing the inlet as it would appear from the side when inside the room of a building, but showing one blade in the maximum ventilation position;

DETAILED DESCRIPTION OF THE PREFERRED EMBODIMENTS OF THE INVENTION

Figure 1:
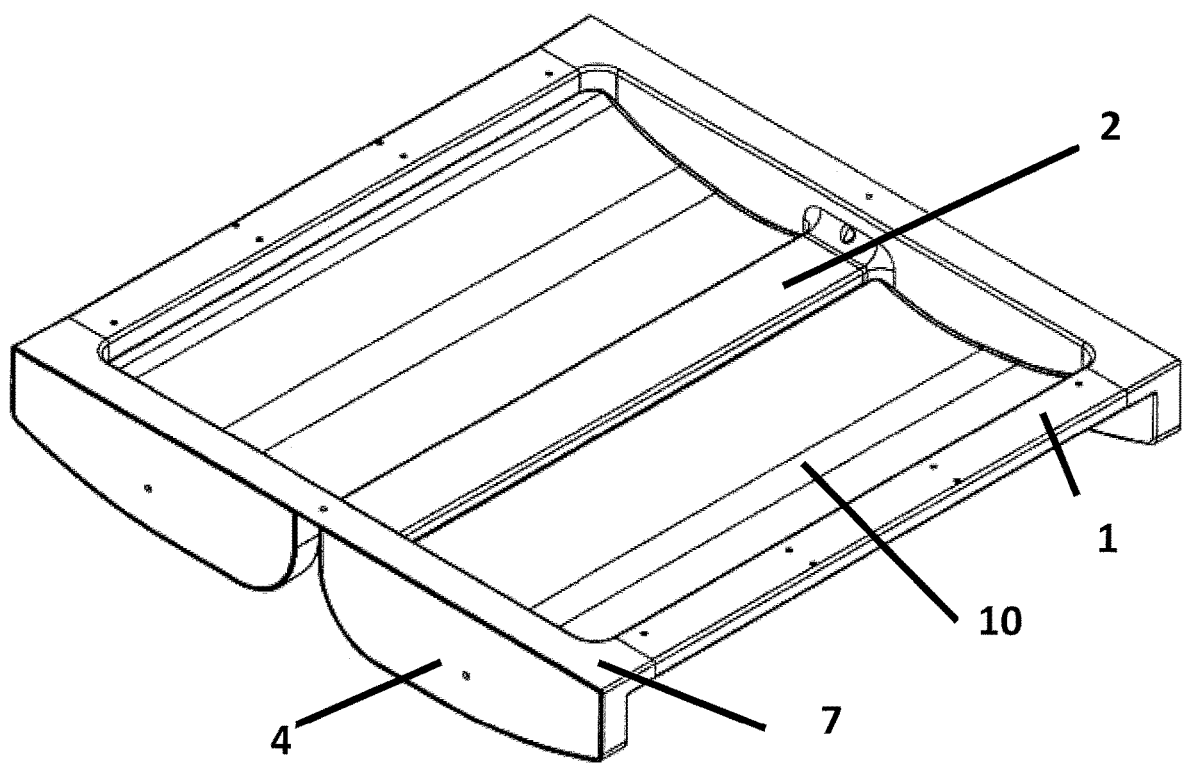
FIG. 1 is a perspective view of a ceiling inlet unit constructed according to the principles of the invention, viewing the unit as it would appear from the top before installation, the view showing the two blades in the closed or shutoff position.
Figure 2:
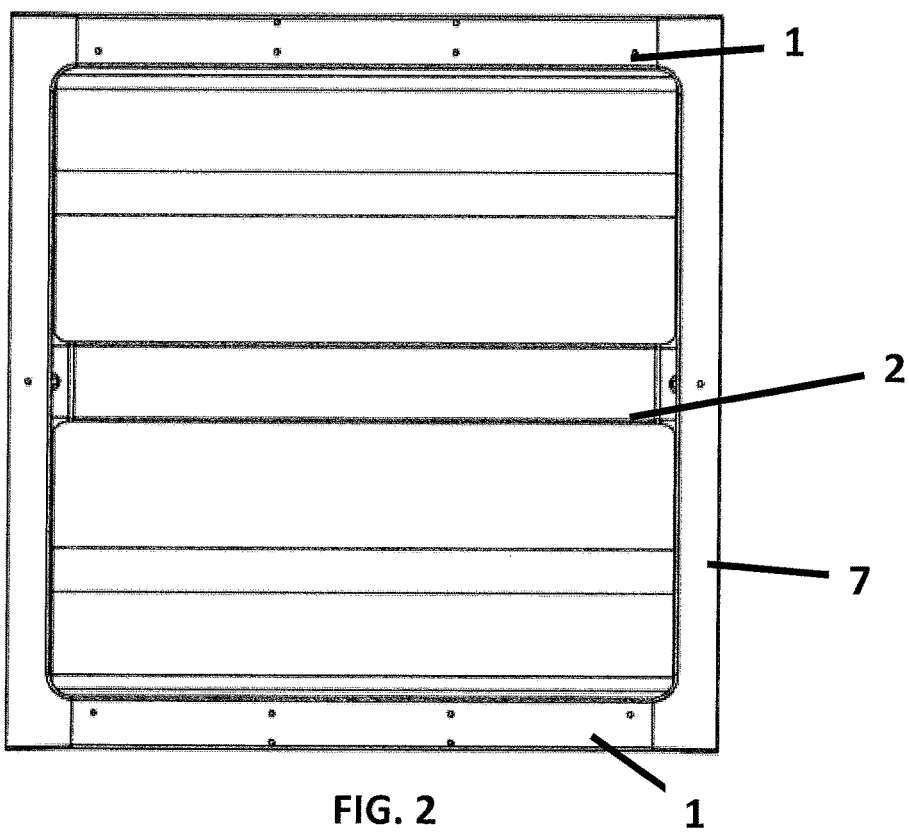
FIG. 2 is a top view of a ceiling inlet constructed according to the principles of the invention.
Figure 3:
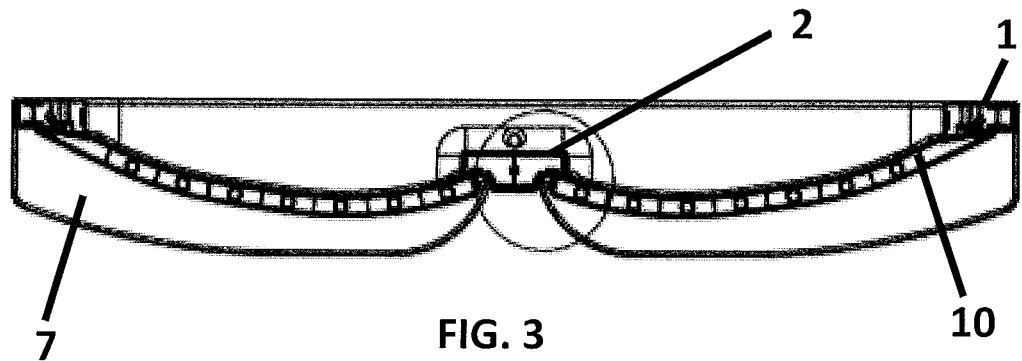
FIG. 3 is a section view of the ceiling inlet unit taken on the line 3-3 of FIG. 2, but viewing the unit as it would appear from the right when inside the room of a building, the view also showing the two blade assemblies in the closed position.
Figure 3A:
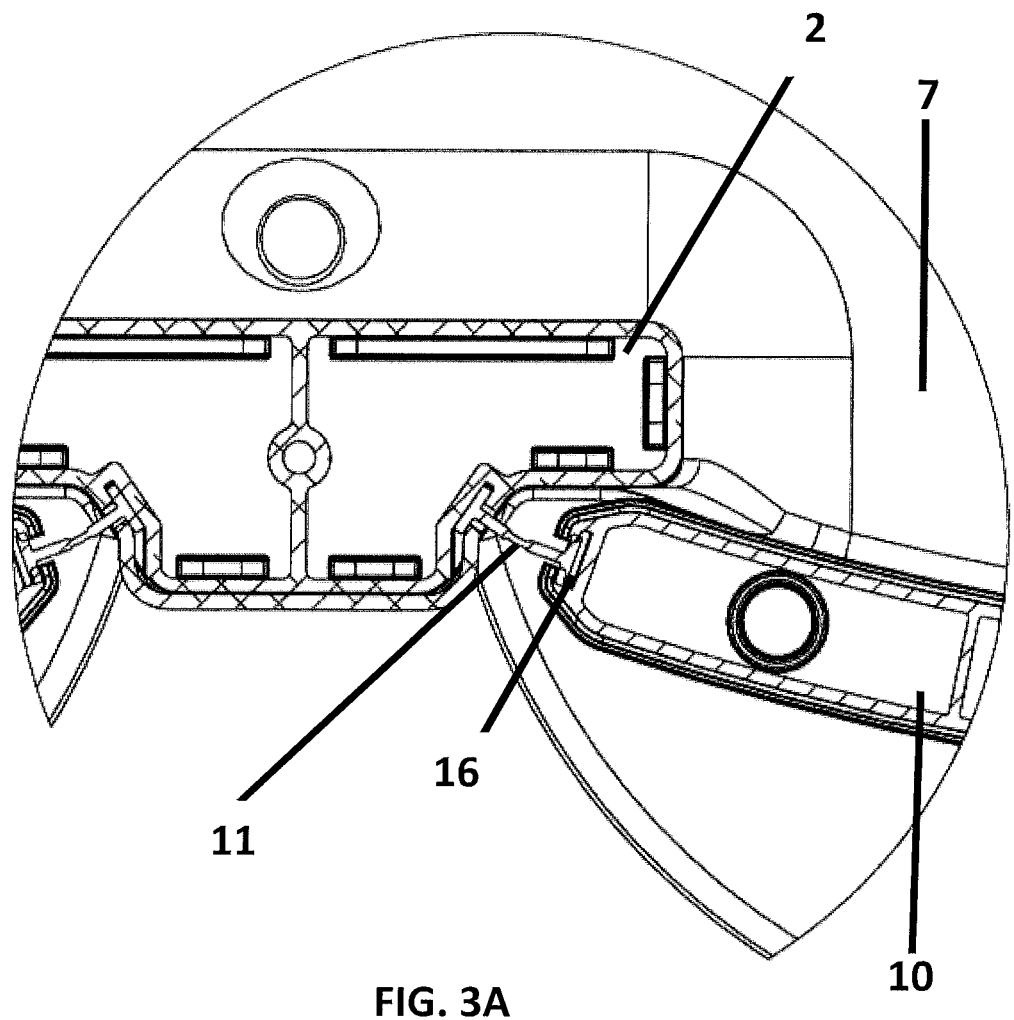
FIG. 3A is an enlarged view of a portion of the hinge assembly of the ceiling inlet unit of FIG. 3.
Figure 3:
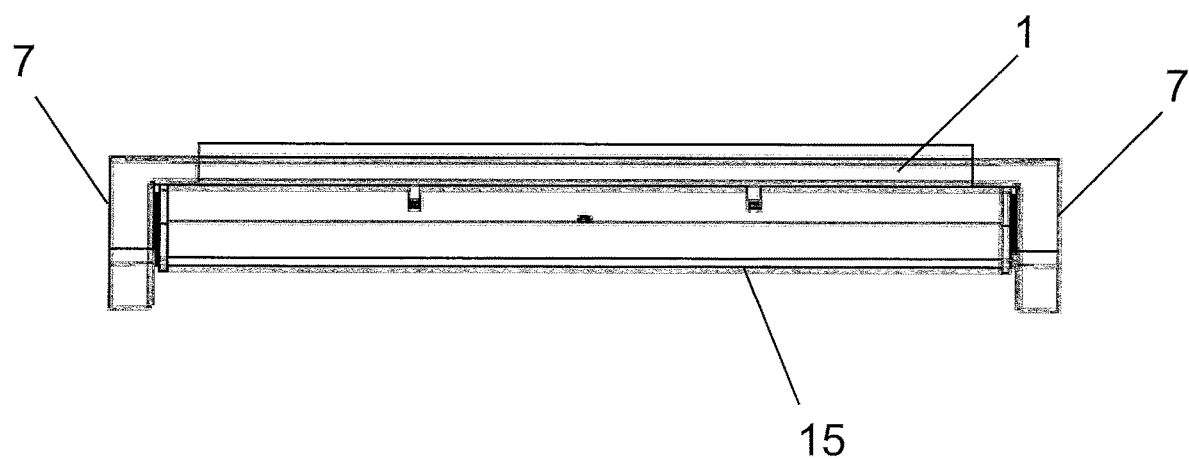
Figure 9:
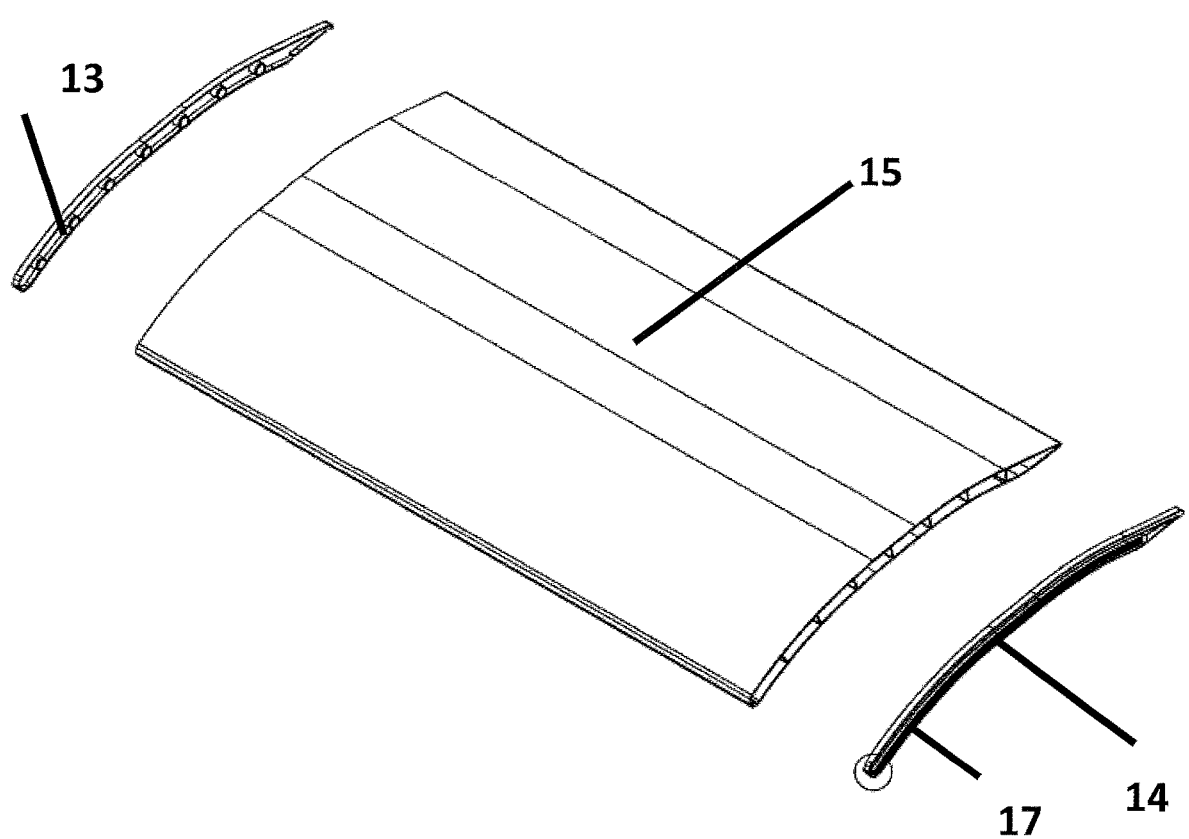
FIG. 9 is an exploded perspective view of the blade assembly as it would appear from the top of the ceiling inlet.
Figure 9A:
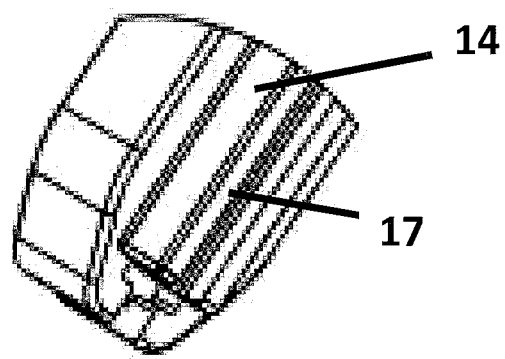
FIG. 9A is an enlarged view of the blade endcap design from the portion of FIG. 9 where the brush border/seal is mated with the endcap.
Figure 10:
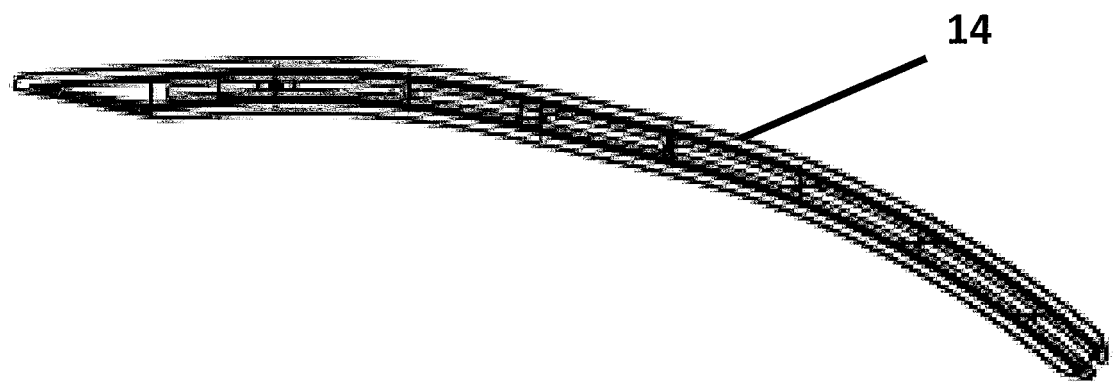
FIG. 10 is a side view of the curved louver geometry as it would appear from the right view of the blade assembly.

Referring first to FIGS. 1 and 2, the basic ceiling inlet unit of the invention is comprised of a frame having two endcap sub-assemblies 4 that connect the frame members and the center profile member 2 and hold them together so that the frame 1 can be used to install the ceiling inlet unit of the invention in an opening in the ceiling of an interior room of a building to be ventilated. As is well known to those skilled in the art, the ceiling inlet unit is combined with an actuator and exhaust or positive pressure fan, outlet damper, or shutter wall (not shown) which, when on and the actuator opens the ceiling inlet unit of the invention, will draw air from the attic of the building through the ceiling inlet unit, and will bring air into the interior room of the building. FIG. 1 shows the top face of the unit at it would appear when viewed from inside of the building before installation, and FIG. 2 shows the top face which faces the rough opening in the ceiling. The frame provides for installing the unit in the ceiling of a building in any suitable manner, and the frame includes two side members 1, two endcaps 4 and 7 that comprise the mounting structure for two blade assemblies 10, and the center profile member 2. FIGS. 3A and 9 show each blade assembly 10 in more detail which is comprised of a curved louver 15, two blade endcaps 13, 14, and two brush borders 17. Brush borders 17 are flexible and compressible seals attached to the blade endcaps 13, 14 to correct small differences in the louver length which occur within the tolerances of the louver. Brush borders 17 are preferably made of a flexible and/or compressible material to allow free movement of the louvers 15 in any weather or temperature.

Figure 4:
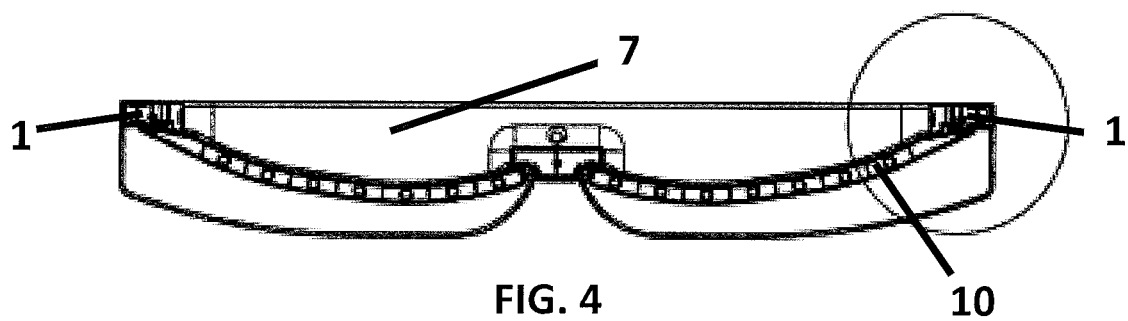
FIG. 4 is a section view of the ceiling inlet unit similar to FIG. 3, viewing the unit as it would appear from the right when inside the room of a building, the view also showing the two blade assemblies in the closed position.
Figure 4A:
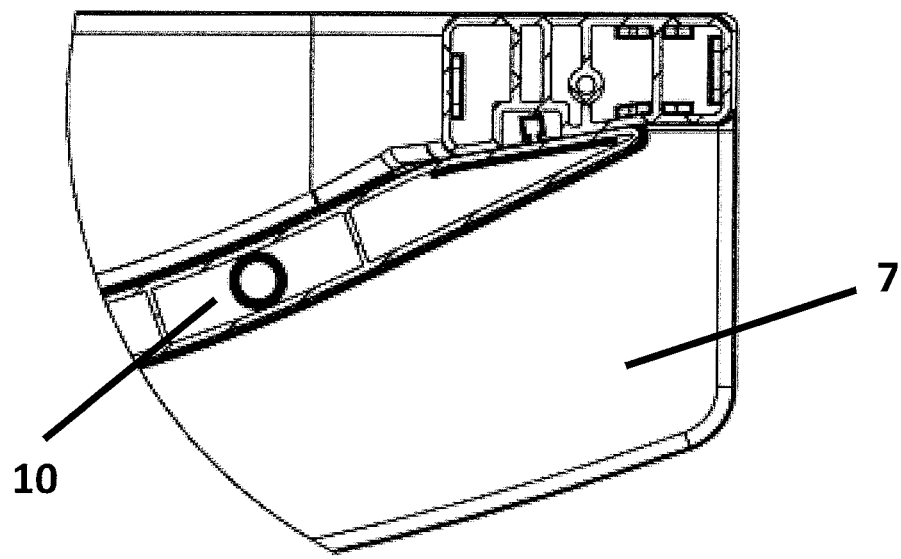
FIG. 4A is an enlarged view of a portion of FIG. 4 but showing where the blade meets the frame profile.
Figure 11:
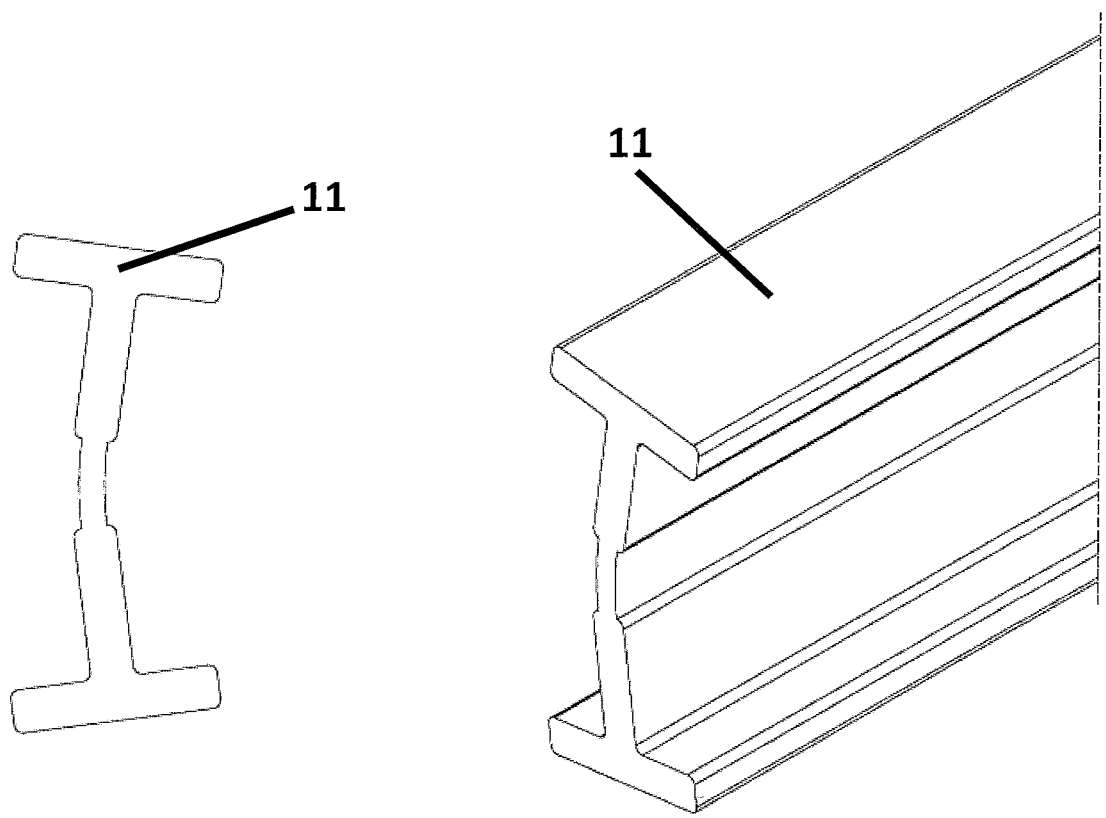
FIG. 11 are views showing the continuous hinge from an end view and also a portion of the hinge in perspective.

FIG. 11 shows the continuous hinge 11 which is shown having two uniform "T" geometries at either end and a thinner, flexible center which connects the two uniform "T" geometries. As best seen in FIG. 3A, each continuous hinge 11 is assembled into the blade assembly 10 and the center member 2 along the entire length of the ceiling inlet which will mitigate any leakage that may flow through the ceiling inlet into the interior room. The continuous hinge 11 has a non-uniform wall thickness in the flexible center of the hinge 11 to allow the blade assemblies 10 to move rotationally from a closed to an open position for minimum or maximum ventilation. This non-uniform wall thickness in the hinge 11 eliminates any need for additional pins or metal rods to be used for pivoting the blade assemblies 10. The continuous hinge 11 also extends the entire length of the louver blade assemblies 10 blocking any air leakage from penetrating through unplanned openings. It will be understood that the blade assemblies pivot open and shut on this continuous hinge, and the hinge allows the inlet to be opened deeper than any other inlet on the market as shown best in FIG. 8. As best seen in FIGS. 3, 4, 6A, 9 and 10, each blade assembly 10 is formed into an aerodynamic shape to maximize the air jet throw along the ceiling of the rooms where the ceiling inlets are installed. As best shown in FIG. 3A, along the top edge of the blade assembly 10 is a longitudinally extending opening 16 for receiving the continuous hinge 11 that provides for attaching each blade assembly 10 within the center member 2. As best seen in FIGS. 4 and 4A, each blade assembly 10 has geometry that mates perfectly against the frame 1 in the closed or shutoff position. This mitigates any leakage that could enter into the interior room of the building. The continuous hinge 11 may be extruded such that the two uniform "T" geometries and the flexible center are made of the same material but have different thickness so the middle is flexible while the "T" geometries are rigid.

Figure 5:
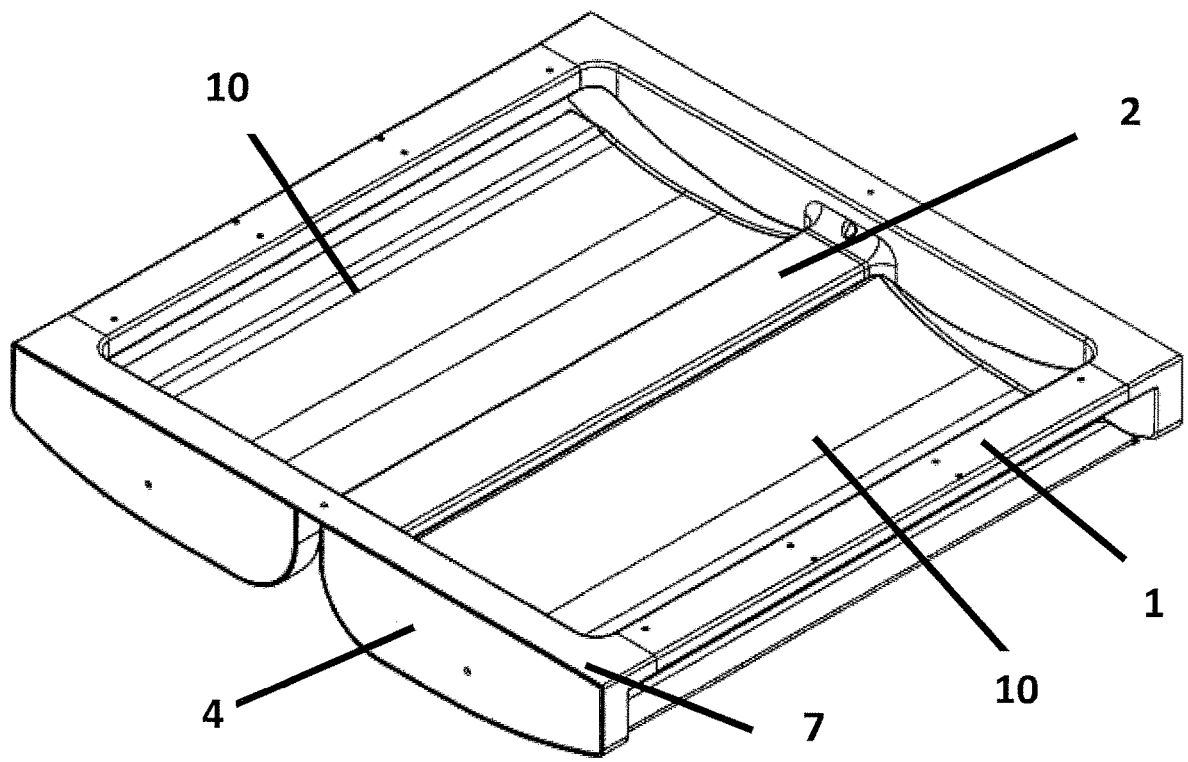
FIG. 5 is a perspective of a ceiling inlet unit constructed according to the principles of the invention, viewing the unit as it would appear from the top before installation, the view showing the two blades in the minimum ventilation position.
Figure 6:
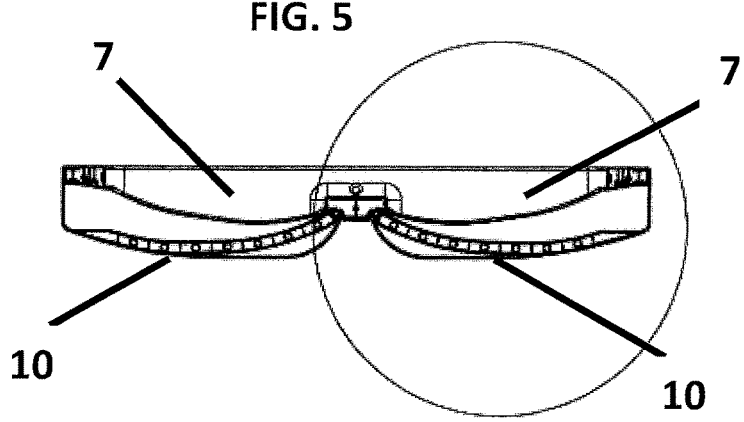
FIG. 6 is a section view of the ceiling inlet similar to FIG. 3, viewing the unit as it would appear from the right when inside the room of a building, the view also showing the two blades in the minimum ventilation position.
Figure 6A:
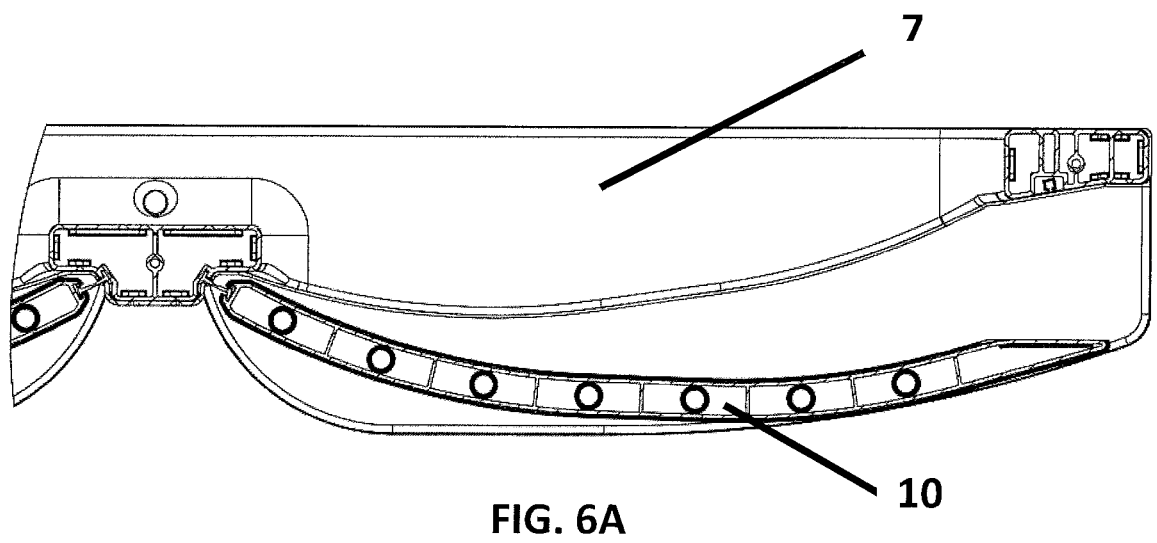
FIG. 6A is an enlarged view of a portion of FIG. 6 but showing the blade curvature during minimum ventilation as well as the endcap design.
Figure 6:
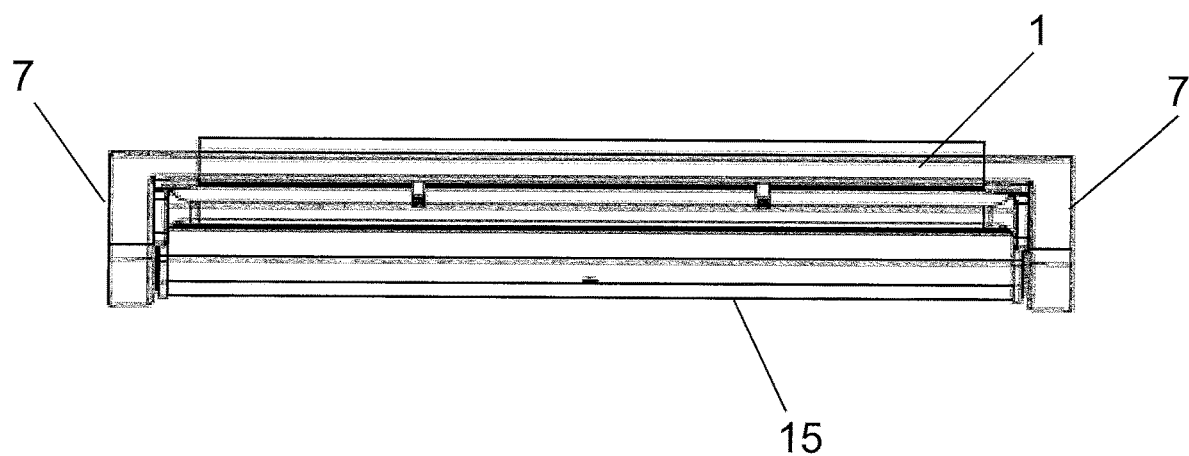

FIGS. 5, 6, and 6A show in more detail how the endcap design 7 is optimized for the minimum ventilation stage. When the blade assemblies 10 are open for minimum ventilation as shown in FIG. 5, the blades are open a few inches. The blade geometry matches the endcap design 7 as shown in FIG. 6A so that there will be no side leakage from the inlet until after minimum ventilation stages are done. As shown in FIG. 6A the blade assemblies 10 are blocked entirely on the sides by the endcap 7 which will increase the overall air jet throw of the inlet. FIG. 5 also shows that the cross-sectional area available for the air to move through the inlet is optimized through the substantially square design. In a substantially square design, the longitudinal length of the blade assembly 10 is between 1.5 to 3 times the width of the blade. Also shown in FIG. 6A is that the middle of the blade assemblies 10 do not reach below the geometry of the endcap 7 when the blade is open for minimum ventilation.

Figure 7:
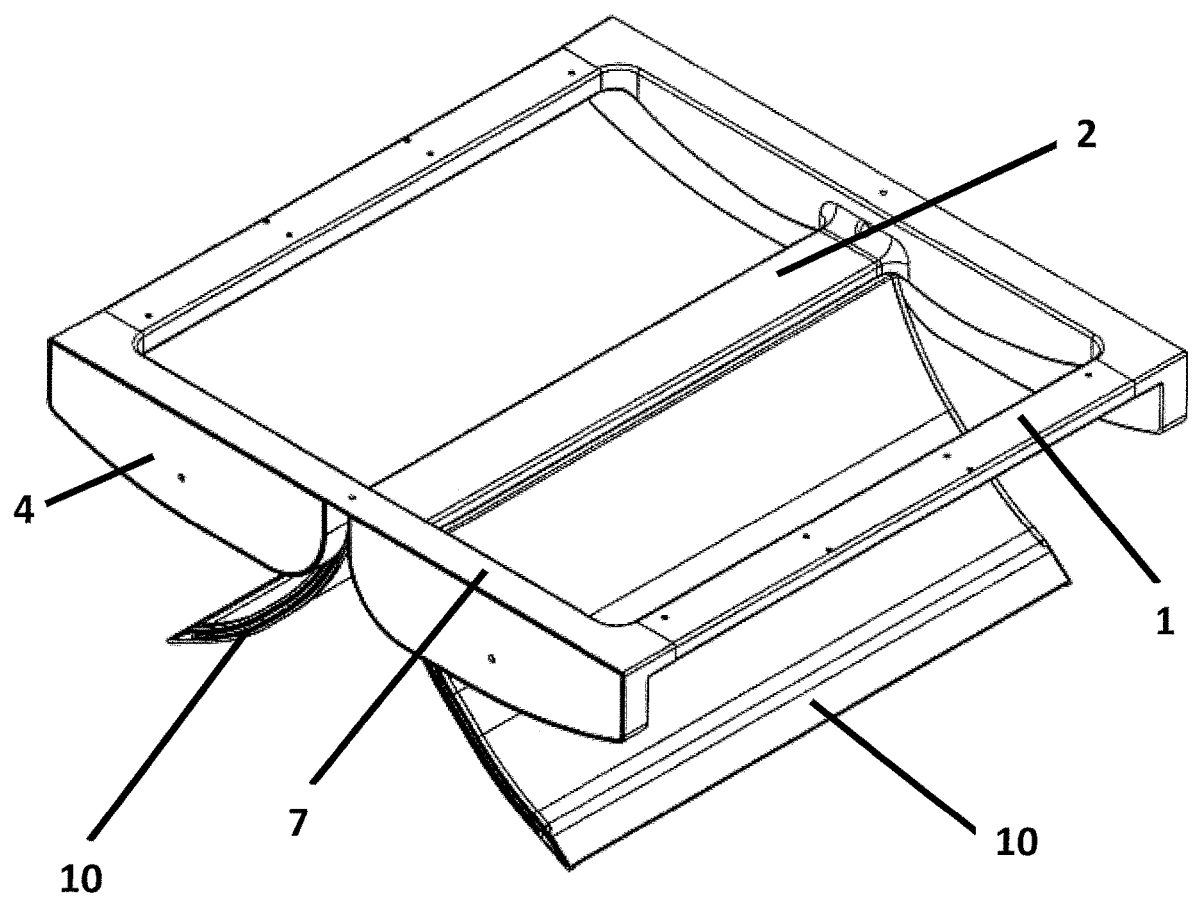
FIG. 7 is a perspective view of the air ventilating unit of the invention, viewing the unit as it would appear from the top before installation, the view showing the two blades in the maximum ventilation position.
Figure 8:
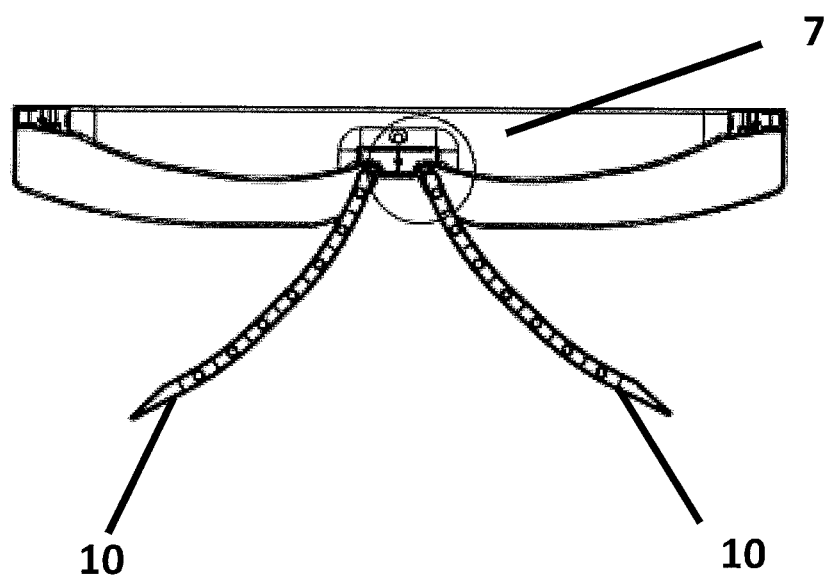
FIG. 8 is a section view similar to FIG. 3, viewing the unit as it would appear from the right when inside the room of a building, the view also showing the two blade assemblies in the maximum ventilation position.
Figure 8:
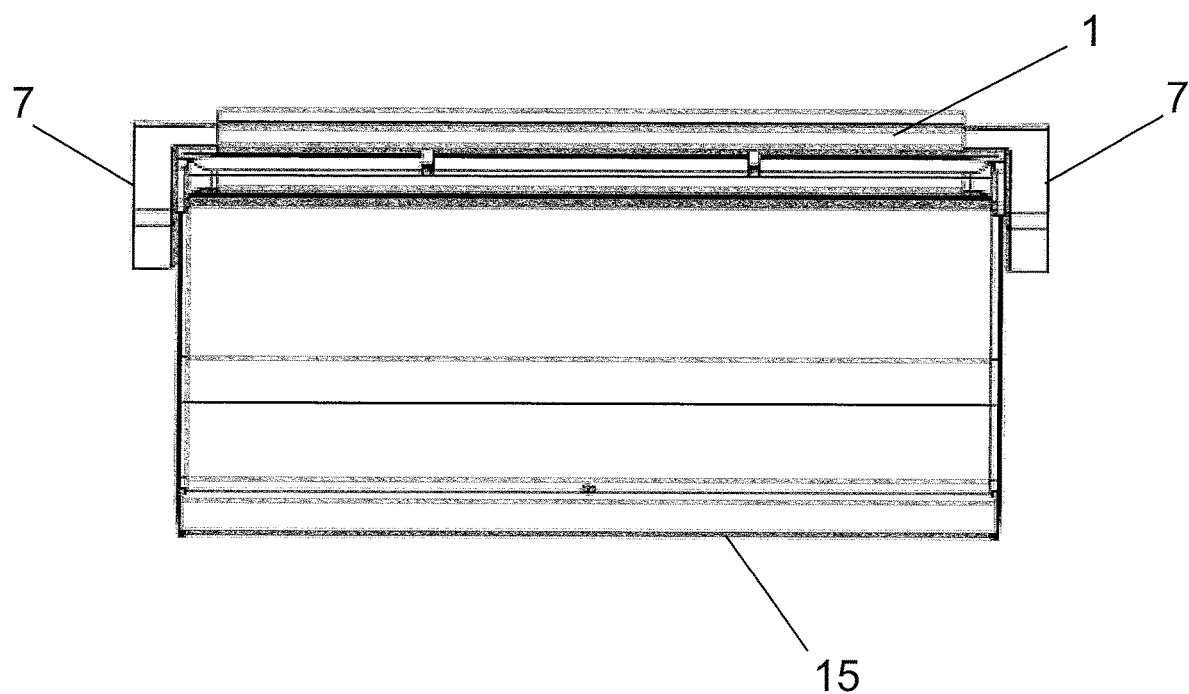

FIGS. 7 and 8 show in more detail how the endcap design 7 is optimized for the maximum ventilation stage. When the blade assemblies 10 are open for maximum ventilation as shown in FIGS. 7 and 8, the blades are able to extend downward more than 8 inches due to the design of the continuous hinge 11. This allows the inlet to achieve maximum total airflow through the inlet during maximum ventilation.

Performance data is shown below for three separate inlet designs from Bess Labs, a certified performance testing location understood and validated by those skilled in the art.

University of Illinois Department of Agricultural Engineering
Bioenvironmental and Structural Systems Lab Final Report

| | |
|---|---|
| Project Number: | 17641 |
| Test Date: | Oct. 31, 2017 |
| Inlet: | |
| Make- | Double L |
| Model- | DL3127 |
| Size- | 25" × 27.5" rough opening |
| Description: | double baffle ceiling inlet |
| Notes: | |
| Test conditions: | |

| T(wb): | 57.0 | Barometric pressure, recorded | 29.51 |
|---|---|---|---|
| T(db): | 77.0 | Barometric pressure, corrected | 29.38 |

| Static Pressure (in. H₂O) | Airflow (cfm.) |
|---|---|
| Full Open | |
| 0.010 | 948 |
| 0.030 | 1663 |
| 0.050 | 2157 |
| 0.070 | 2553 |
| 0.100 | 3034 |
| 0.125 | 3355 |
| 0.150 | 3695 |
| 0.200 | 4227 |
| 0.250 | 4694 |
| Baffles 8" open | |
| 0.100 | 2187 |
| Baffles 4" open | |
| 0.100 | 1284 |
| Baffles 2" open | |
| 0.100 | 667 |
| Baffles 1" open | |
| 0.100 | 348 |
| Baffles 0.5" | |
| 0.100 | 221 |
| Baffles 0.25" | |
| 0.100 | 141 |
| Baffles closed (leakage) | |
| 0.100 | 4 |

| | |
|---|---|
| Project Number: | 19572 |
| Test Date: | Dec. 4, 2019 |
| Inlet: | |
| Make- | Double L |
| Model- | DL4727 |
| Size- | 24.5" × 44" rough opening |
| Description: | double baffle ceiling inlet |
| Notes: | |
| Test conditions: | |

| T(wb): | 55.0 | Barometric pressure, recorded | 29.07 |
|---|---|---|---|
| T(db): | 75.0 | Barometric pressure, corrected | 28.95 |

| Static Pressure (in, H₂O) | Airflow (cfm) | Velocity Average (fpm) | Velocity Max (fpm) |
|---|---|---|---|
| Full Open | | | |
| 0.050 | 3325 | | |
| 0.070 | 3903 | | |
| 0.100 | 4628 | | |
| 0.125 | 5165 | | |
| 0.150 | 5708 | | |
| 0.200 | 6602 | | |
| ½" open | | | |
| 0.050 | 203 | | |
| 0.100 | 308 | 757 | 871 |
| 0.125 | 368 | | |
| 0.150 | 424 | | |
| 1" open | | | |
| 0.050 | 415 | | |
| 0.100 | 607 | 843 | 1051 |
| 0.125 | 712 | | |
| 0.150 | 811 | | |
| 2" open | | | |
| 0.050 | 729 | | |
| 0.100 | 1056 | 1055 | 1155 |
| 0.125 | 1193 | | |
| 0.150 | 1332 | | |
| 4" open | | | |
| 0.050 | 1406 | | |
| 0.100 | 1982 | 1099 | 1194 |

University of Illinois Department of Agricultural Engineering
Bioenvironmental and Structural Systems Lab Final Report

| | |
|---|---|
| 0.125 | 2217 |
| 0.150 | 2240 |

6" open

| | | | |
|---|---|---|---|
| 0.050 | 1960 | | |
| 0.100 | 2854 | 1190 | 1277 |
| 0.125 | 3140 | | |
| 0.150 | 3500 | | |

8" open

| | | | |
|---|---|---|---|
| 0.050 | 2322 | | |
| 0.100 | 3343 | 1148 | 1236 |
| 0.125 | 3694 | | |
| 0.150 | 4048 | | |

| | |
|---|---|
| Project Number: | 19261 |
| Inlet: | Inlet |
| Make- | Double L |
| Model- | DL3232 |
| Size- | 28" × 14.5" baffles (2) |
| Description | double baffle ceiling inlet |
| Notes | 29.5" ×29.5" Rough opening |
| | Velocities: Kestrel 5500 anemometer |

Test conditions

| | |
|---|---|
| T(wb): | 60.0 |
| T(db): | 78.0 |

| Static Pressure (in. H$_2$O) | Airflow (cfm) | Velocity Average (fpm) | Velocity Max (fpm) |
|---|---|---|---|

1" Baffle openings

| | | | |
|---|---|---|---|
| 0.050 | 309 | | |
| 0.100 | 444 | 1005 | 1084 |
| 0.125 | 509 | | |
| 0.150 | 548 | | |

2" Baffle openings

| | | | |
|---|---|---|---|
| 0.050 | 535 | | |
| 0.100 | 771 | 1111 | 1150 |
| 0.125 | 864 | | |
| 0.150 | 962 | | |

4" Baffle openings

| | | | |
|---|---|---|---|
| 0.050 | 989 | | |
| 0.100 | 1410 | 1188 | 1214 |
| 0.125 | 1571 | | |
| 0.150 | 1745 | | |

6" Baffle openings

| | | | |
|---|---|---|---|
| 0.050 | 1472 | | |
| 0.100 | 2081 | 1132 | 1214 |
| 0.125 | 2281 | | |
| 0.150 | 2546 | | |

8" Baffle openings

| | | | |
|---|---|---|---|
| 0.050 | 1856 | | |
| 0.100 | 2607 | 1151 | 1202 |
| 0.125 | 2904 | | |
| 0.150 | 3217 | | |

Full Open

| | | | |
|---|---|---|---|
| 0.050 | 2958 | | |
| 0.100 | 4195 | 1223 | 1282 |
| 0.125 | 4630 | | |
| 0.150 | 5075 | | |

Bess Labs Test project number 17641 is testing on a standard ceiling inlet in the industry. This inlet has a curved louver that is not as deep as the ceiling inlet of the invention and the ceiling inlet is of rectangular shape. Test project number 19572 is a similar design to the inlet in 17641, but the ceiling inlet is longer and more rectangular to achieve more maximum airflow than the option from test 17641. Test project number 19261 is performance data relating to the ceiling inlet of the invention. Testing is conducted on each inlet at different baffle openings, and baffle is a description synonymous with louver blade. Those skilled in the art understand that when the test is conducted for smaller louver openings (1"-4") it is evaluating the performance of minimum ventilation mode. When the test is conducted for larger openings (8", full open) it is evaluating the maximum ventilation performance. Those skilled in the art understand that the data from a 0.100" S.P. is the typical performance data point used for comparison purposes as this static pressure is very close the operating pressure in modern livestock and swine facilities. Performance data can be applied to equation 2 from above to calculate the drag coefficient of each inlet. Those skilled in the art understand that inlet efficiency is directly related to the drag coefficient of the inlet. The drag coefficient is understood by those skilled in the art on a scale of 0 to 1, with 1 being the most efficient air inlet possible.

$$C_d = \frac{\dot{V}}{A_{actual}\sqrt{\frac{2\Delta P}{\rho}}}$$

Where:

$\dot{V}$=Total volume of air entering through inlet $A_{actual}$=Total Cross-sectional area of opening for air to move through $C_d$=drag coefficient of the inlet P=Static pressure differential across inlet ρ=density of incoming air Applying the above performance data to equation number 2, and utilizing information from the Carrier psychrometric chart (see FIG. 12) that is approved by those skilled in the art yields an example drag coefficient calculation in excel as follows:

| Inlet Model Number | D13127 | DL4727 | DL3232 |
|---|---|---|---|
| Bess Labs Test Number | 17641 | 19572 | 19261 |
| Test Type: Ceiling inlet louver 2" open | | | |
| Inputs: | | | |
| Wet bulb Temperature (° F., Bess labs data) | 57 | 55 | 60 |
| Dry Bulb Temperature (° F., Bess labs data) | 77 | 75 | 78 |
| Specific Volume (ft3/lb, Carrier Psychometric chart) | 13.60 | 13.55 | 13.70 |
| Length Blade opening (in., inlet dimension) | 28.00 | 43.00 | 29.00 |
| Depth blade opening (in., inlet dimension) | 2.00 | 2.00 | 2.00 |
| Volumetric flow rate (cfm, Bess labs data) | 667 | 1056 | 771 |
| Static Pressure (in. w.c., Bess labs data) | 0.100 | 0.100 | 0.100 |
| Calculated Values: | | | |
| Air density (kg/m3) | 1.18 | 1.18 | 1.17 |
| A, actual (in2) | 112.00 | 172.00 | 116.00 |
| A,actual (m2) | 0.07 | 0.11 | 0.07 |
| Volumetric flow rate (m3/s) | 0.31 | 0.50 | 0.36 |

| Inlet Model Number | D13127 | DL4727 | DL3232 |
|---|---|---|---|
| Static Pressue (Pa) | 24.88 | 24.88 | 24.88 |
| SQRT((2ΔP/p)) | 6.50 | 6.49 | 6.52 |
| Cd, inlet drag coefficent | 0.670 | 0.692 | 0.745 |

Figure 12:
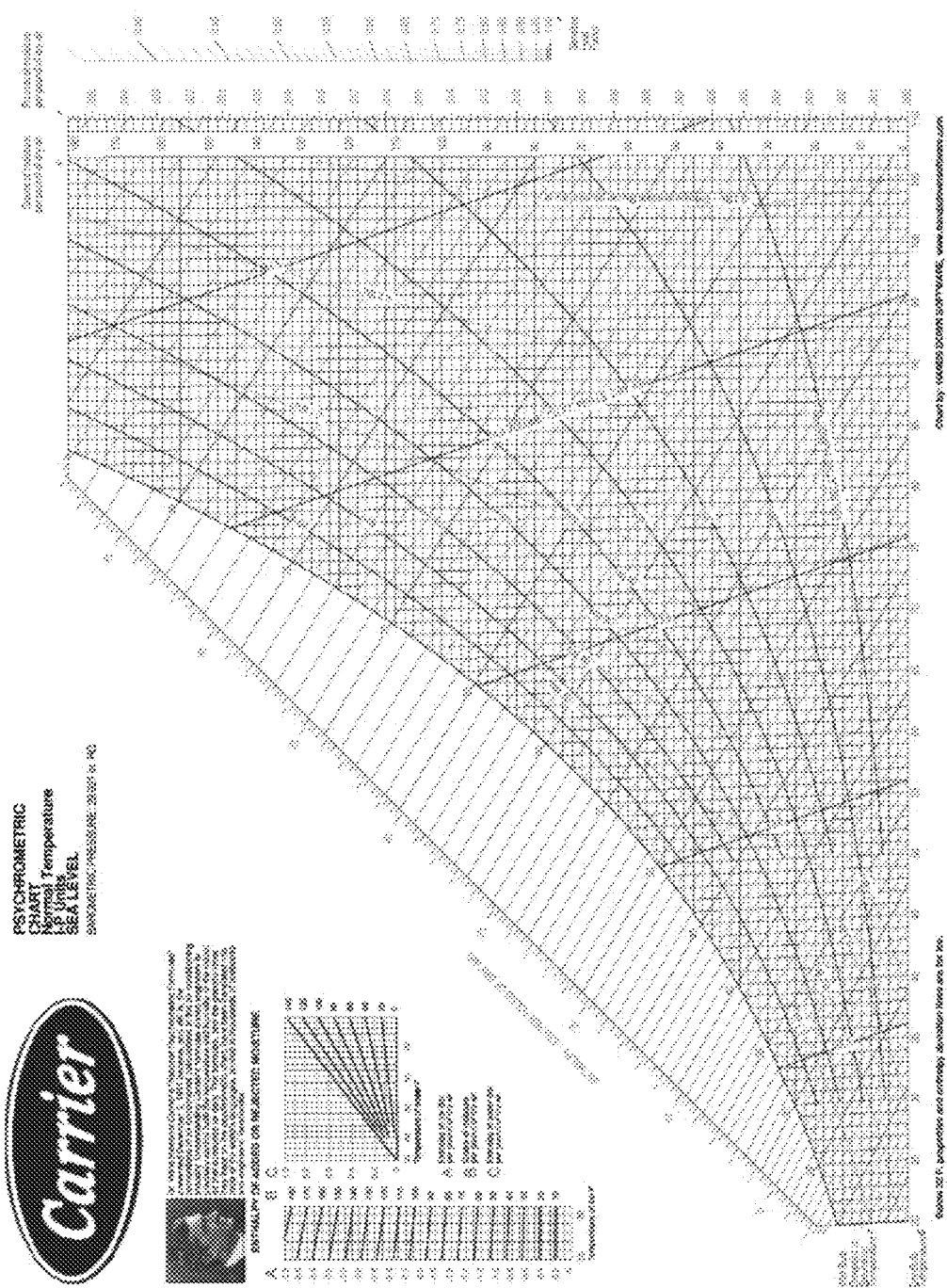
FIG. 12 is a prior art psychrometric chart from the air conditioning company Carrier Corporation.
Figure 13:
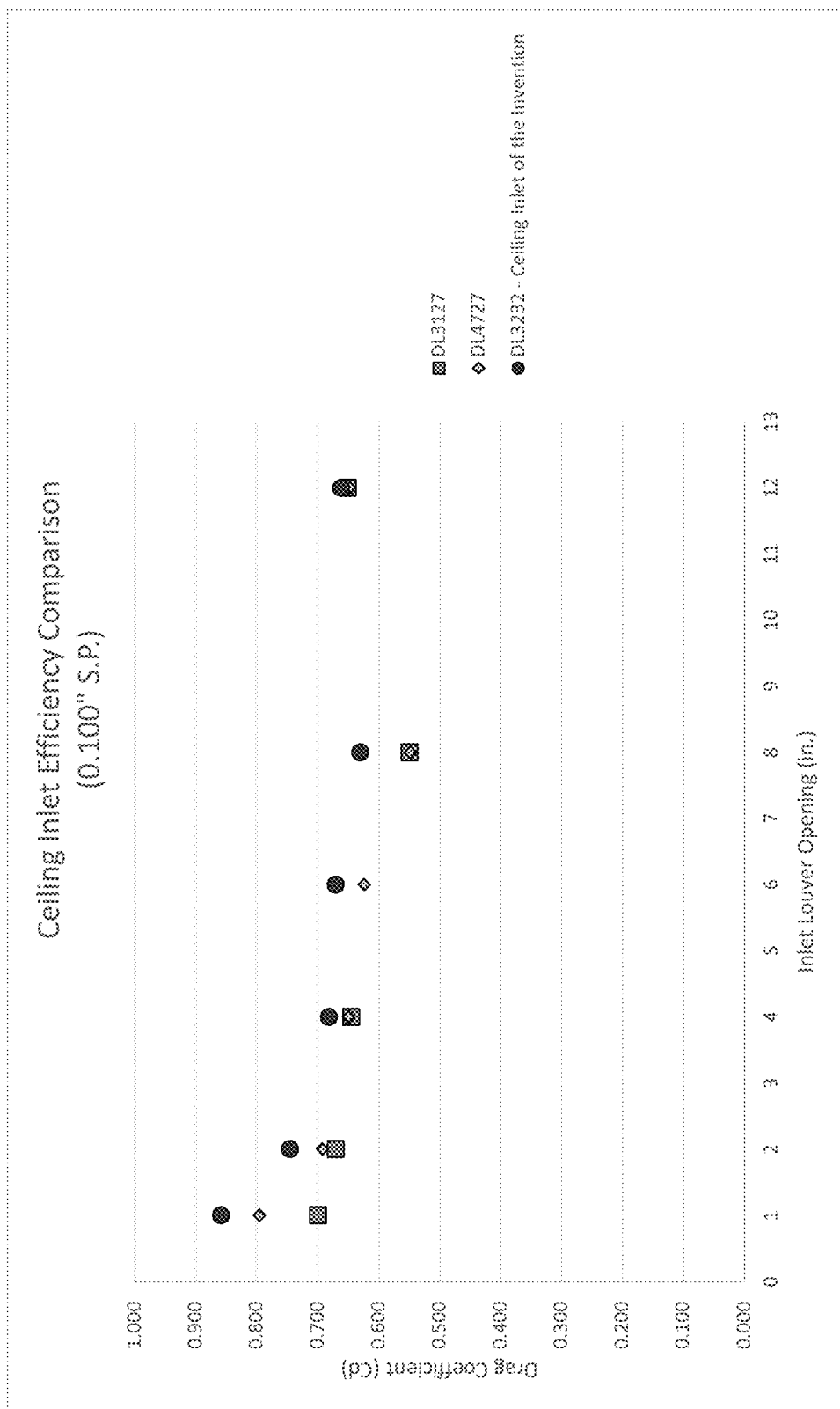
FIG. 13 us a graphical representation from data of the inlet of the invention showing the efficiency of the inlet.

As shown in FIG. 12, the ceiling inlet of the invention has a proven calculated drag coefficient that is larger than other standard ceiling inlets offered by the market, and this directly correlates to the increased efficiency that the ceiling inlet of the invention offers. The ceiling inlet of the invention provides more efficient mixing at both minimum and maximum ventilation modes shown by the calculation.

Figure 14:
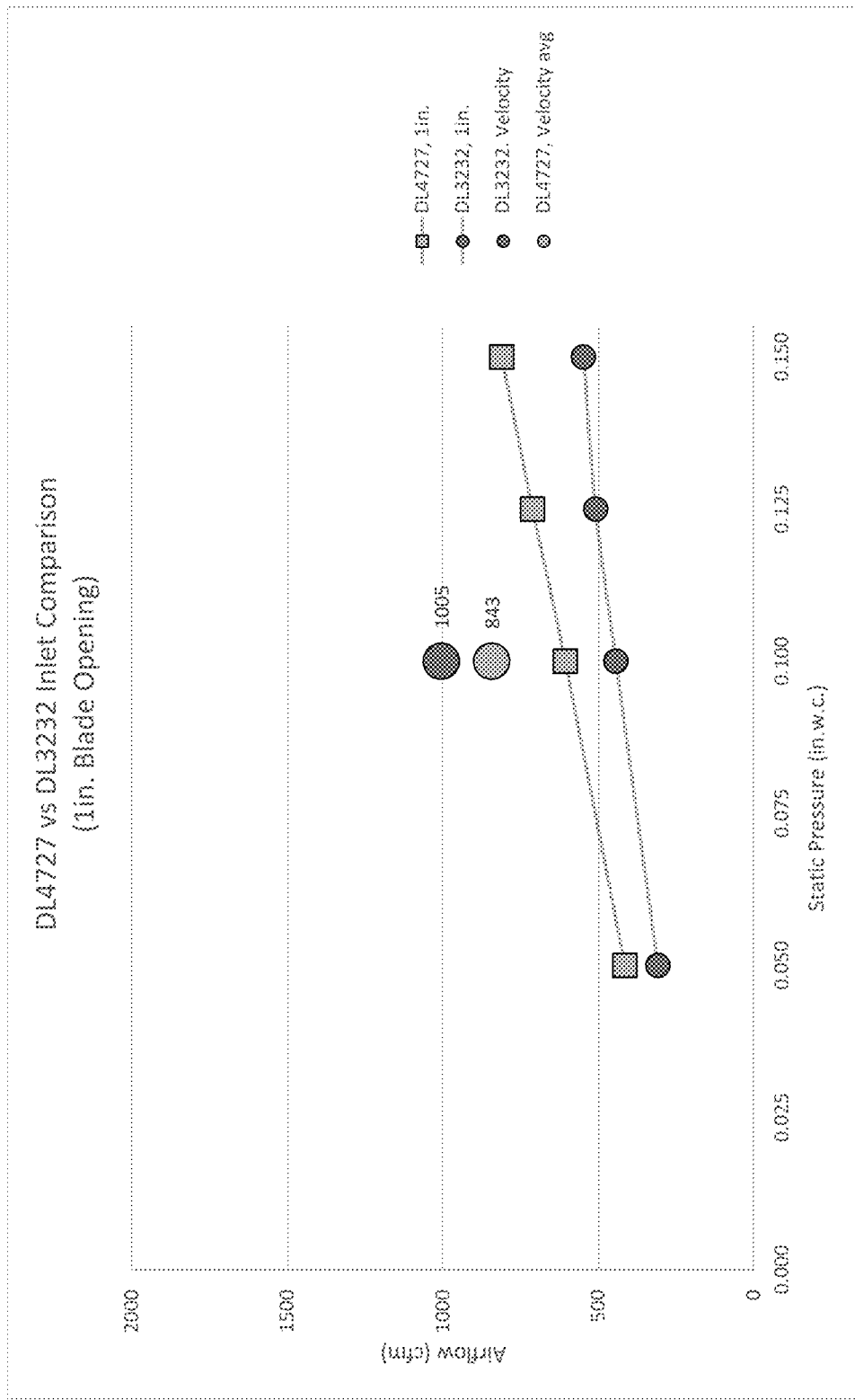
FIG. 14 is a graphical representation illustrating the efficiency of the inlet of the invention because of the increased velocity of air flow through the inlet when partially open.

Another indicator of inlet efficiency understood by those skilled in the art is air jet throw which is measured as velocity. Performance data as shown by Bess Labs above displays velocities at different louver openings for review. A graph displaying the data when the ceiling inlet of the invention is open 1 inch (or during minimum ventilation) is shown in FIG. 14. This ceiling inlet of the invention provides 444 cubic feet per minute of air at a 1,005 feet per minute velocity while the standard rectangular inlet of the industry provides 607 cubic feet per minute of air at only 843 feet per minute velocity.

The ceiling inlet of the invention can provide less airflow at an increased velocity compared to a standard rectangular inlet of the industry. The ability to provide less cfm of air during minimum ventilation at an increased velocity promotes uniform temperature distribution through more efficient air mixing, and this is desirable as the grower will have more control over the air entering the facility than other ceiling inlets. When inlets are less efficient and do not have high velocity or good air jet throw, the air drops to the animal occupied zone before sufficiently mixing and heating up the air and this leads to chilling animals and creating an environment that creates cold stress on the livestock or pigs.

Figure 15:
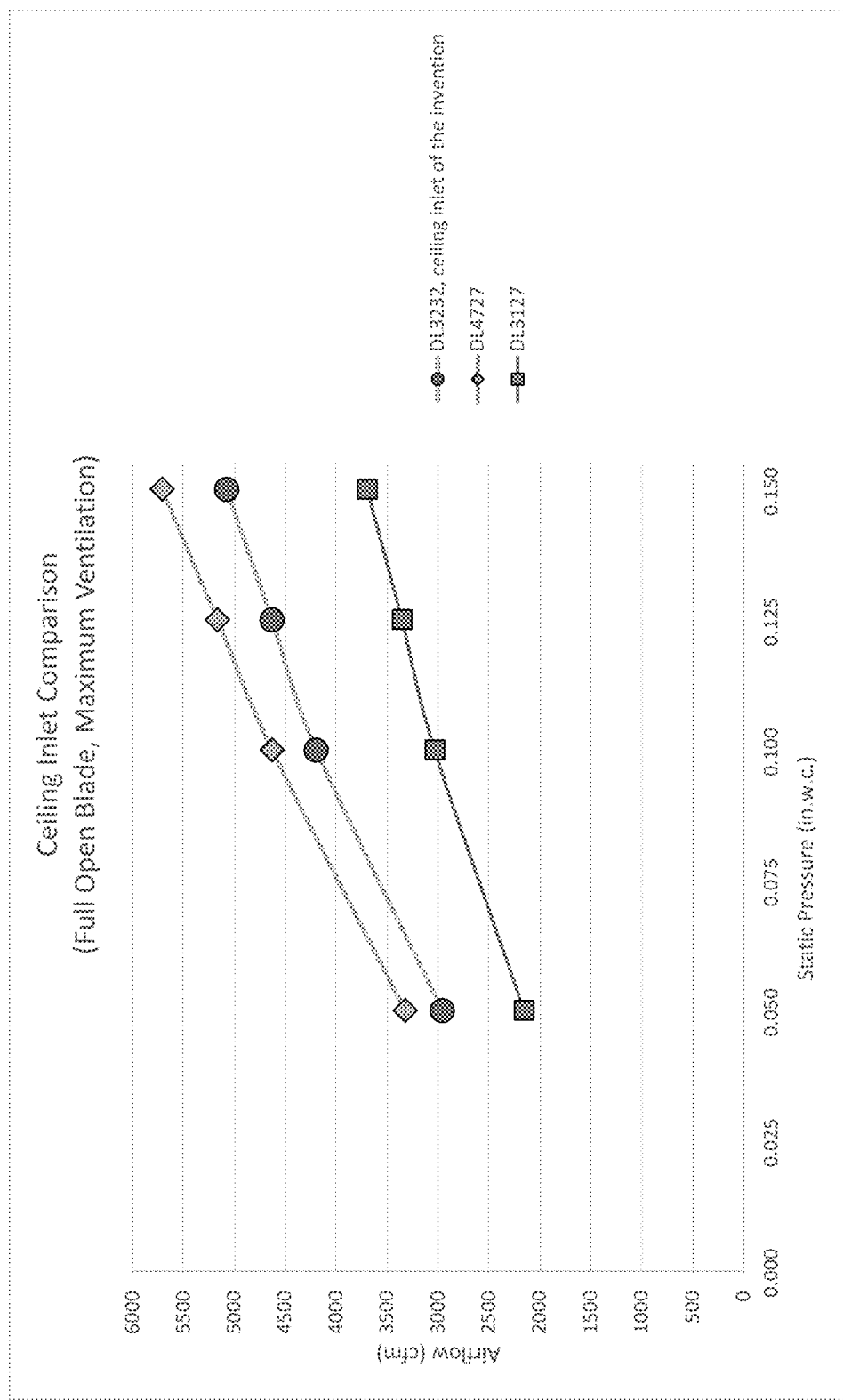
FIG. 15 is a graphical representation similar to FIG. 14 showing the increased velocity of air flow through the inlet when the inlet is fully open.

The ceiling inlet of the invention when in maximum ventilation mode (see FIG. 15) provides 4,195 cubic feet per minute ("cfm") at a 0.100 in. S.P., and this provides a higher airflow capacity than a traditional rectangular design (DL3127). A traditional inlet design only provides 3,034 cfm at 0.100 in. S.P. Those skilled in the art understand that over 4,000 cfm is the desired target for a larger capacity ceiling inlet.

Having thus described the invention in connection with the preferred embodiments thereof, it will be evident to those skilled in the art that various revisions can be made to the preferred embodiment described herein without departing from the spirit and scope of the invention.

The invention claimed is:

1. An air inlet unit for use in a building and having a fan that provides airflow between an interior of the building and an exterior of the building, wherein the air inlet unit comprises:
 a frame suitable for mounting the air inlet unit in a wall of the building, the frame including endcaps and longitudinal members combined with and extending between the endcaps, wherein each of the endcaps includes an endcap frame, a foam insert and an endcap cover, and wherein the frame has an opening providing communication to the exterior of the building;
 at least one blade assembly having a louver with an aerodynamic shape comprising a top edge, a bottom edge and outer ends, wherein the at least one blade assembly is mounted at the top edge between the longitudinal members of the frame so as to be moveable from an open position to a closed position, wherein in the closed position the bottom edge engages one of the longitudinal members;
 a continuous hinge for mounting the at least one blade assembly at the top edge and for restricting air flow leakage at the top edge, wherein the continuous hinge is located between the longitudinal members.

2. The air inlet unit of claim 1, further comprising a center member extending between and connected to the endcaps, wherein the continuous hinge is connected to the center member for mounting the at least one blade assembly.

3. The air inlet unit of claim 2, wherein the at least one blade assembly includes two blade assemblies each connected to the center member at respective top edges of the two blade assemblies by the continuous hinge.

4. The air inlet unit of claim 1, wherein each blade assembly includes the blade and blade ends located at the outer ends.

5. The air inlet unit of claim 4, wherein the blade ends each include a brush border seal.

6. The air inlet unit of claim 1, wherein the at least one blade assembly includes a rounded edge and the frame includes a rounded edge to facilitate the airflow into and through the air inlet unit.

7. The air inlet unit of claim 1, wherein the continuous hinge extends between the endcaps to span a length of the air inlet unit.

8. The air inlet unit of claim 2, wherein the continuous hinge is connected to the center member and the top edge of the at least one blade assembly along a length of the center member between the endcaps.

9. The air inlet unit of claim 1, wherein the continuous hinge and the longitudinal members have rounded interior edges to facilitate the airflow through the opening of the frame.

10. The air inlet unit of claim 1, wherein the frame is substantially square-shaped.

11. The air inlet unit of claim 1, wherein the top edge of the louver is provided with a longitudinally extending opening for receiving the continuous hinge.

12. The air inlet unit of claim 2, wherein the top edge of the blade assembly is provided with a longitudinally extending opening for receiving a first portion of the continuous hinge and the center member is provided with longitudinally extending opening for receiving a second portion of the continuous hinge.

13. The air inlet unit of claim 1, wherein at a minimum ventilation in the open position, the bottom edge of the at least one blade assembly does not engage with the longitudinal members and the outer ends of the at least one blade assembly engage with the endcaps for an increase of a jet throw of the air flow.

14. The air inlet unit of claim 1, wherein at a maximum ventilation in the open position, the at least one blade assembly is pivoted at the continuous hinge such that the bottom edge extends at least 8 inches from the longitudinal members.

15. The air inlet unit of claim 1, wherein the air inlet unit is fully insulated.

16. The air inlet unit of claim 1, wherein the at least one blade assembly has a longitudinal length which is between one and one half to three times a width of the at least one blade assembly.

17. The air inlet unit of claim 1, wherein the continuous hinge includes two "T" geometries with a flexible middle between the two "T" geometries.

18. The air inlet unit of claim 1, wherein the at least one blade assembly provides a longitudinally extending opening for receiving the continuous hinge.

\* \* \* \* \*